United States Patent
Matsushita

(10) Patent No.: US 10,250,402 B2
(45) Date of Patent: Apr. 2, 2019

(54) COMMUNICATION METHOD AND STORAGE MEDIUM STORING COMMUNICATION PROGRAM

(71) Applicant: Brother Kogyo Kabushiki Kaisha, Nagoya-shi, Aichi-ken (JP)

(72) Inventor: Takashi Matsushita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/824,562

(22) Filed: Nov. 28, 2017

(65) Prior Publication Data
US 2018/0254912 A1 Sep. 6, 2018

(30) Foreign Application Priority Data
Mar. 3, 2017 (JP) .................................. 2017-039975

(51) Int. Cl.
| | |
|---|---|
| *H04M 7/14* | (2006.01) |
| *H04L 12/18* | (2006.01) |
| *H04L 29/06* | (2006.01) |
| *H04M 3/56* | (2006.01) |
| *H04N 7/15* | (2006.01) |

(52) U.S. Cl.
CPC ...... *H04L 12/1827* (2013.01); *H04L 12/1822* (2013.01); *H04L 65/403* (2013.01); *H04M 3/567* (2013.01); *H04N 7/152* (2013.01)

(58) Field of Classification Search
USPC .......................................... 348/14.08, 14.09
See application file for complete search history.

(56) References Cited

U.S. PATENT DOCUMENTS

| | | | |
|---|---|---|---|
| 7,937,442 B2 * | 5/2011 | Sekaran | H04L 12/1827 348/14.09 |
| 8,645,465 B2 | 2/2014 | Sekaran et al. | |
| 2013/0100237 A1 * | 4/2013 | Zeng | H04N 7/15 348/14.08 |

(Continued)

FOREIGN PATENT DOCUMENTS

JP 2014-158203 A 8/2014

*Primary Examiner* — Quoc D Tran

(74) *Attorney, Agent, or Firm* — Banner & Witcoff, Ltd.

(57) ABSTRACT

A communication method includes: transmitting a change request from a first conference server to a management server; determining that a second conference server is a conference server after change; transmitting an ID identifying the second conference server from the management server to the first conference server; transmitting a control request from the first conference server to the second conference server based on the ID; performing communication between the second conference server and the management server to confirm whether the second conference server is permitted to control the particular conference room; performing an initialization processing to control the particular conference room; transmitting a completion notification of initialization from the second conference server to the first conference server; transmitting a change instruction from the first conference server to each particular client; connecting each particular client with the second conference server; and disconnecting connection between each particular client and the first conference server.

8 Claims, 6 Drawing Sheets

(56) References Cited

U.S. PATENT DOCUMENTS

2014/0267573 A1\* 9/2014 Aziz ..................... H04N 7/152
                                                                               348/14.09
2018/0212789 A1\* 7/2018 Kudo .................. H04L 65/1069
2018/0278661 A1\* 9/2018 Kudo .................. H04L 65/4053

\* cited by examiner

FIG. 2

(A) CLIENT 3A

| CONFERENCE ROOM ID | CONFERENCE SETTING | USER ID |
|---|---|---|
| 101 | XXX | U101A |

(B) CONFERENCE SERVER 2A

| CONFERENCE ROOM ID | CONFERENCE SETTING | USER ID | CLIENT ID |
|---|---|---|---|
| 101 | XXX | U101A | 3A |
| | | U101B | 3B |
| | | U101C | 3C |

(C) MANAGEMENT SERVER 5

| BASE ID | CONFERENCE SERVER ID | CONFERENCE ROOM ID | CONFERENCE SETTING | USER ID | CLIENT ID |
|---|---|---|---|---|---|
| E1 | 2A | 101 | XXX | U101A | 3A |
| | | | | U101B | 3B |
| | | | | U101C | 3C |
| | 2B | 102 | ... | ... | ... |
| | 2C | 103 | ... | ... | ... |
| E2 | ... | 104 | ... | ... | ... |
| | ... | ... | ... | ... | ... |

COMMUNICATION METHOD AND STORAGE MEDIUM STORING COMMUNICATION PROGRAM

CROSS REFERENCE TO RELATED APPLICATIONS

This application claims priority from Japanese Patent Application No. 2017-039975 filed Mar. 3, 2017. The entire content of the priority application is incorporated herein by reference.

TECHNICAL FIELD

This disclosure relates to a communication method for realizing a teleconference by performing communication through a network, and relates to a storage medium storing a communication program.

BACKGROUND

There is a known conference system that uses a multipoint control unit (MCU) to perform a teleconference. There is a case that, in such conference system, switching the MCU controlling a specific conference room to another MCU while maintaining the conference room. In another known conference system, for example, when available resources in a first MCU are not enough, address information on a second MCU having excessive resources is transmitted to a plurality of conference terminals participating in a conference room controlled by the first MCU. Each of the conference terminals receives the address information and switches a connection destination from the first MCU to the second MCU based on the address information. The control of the conference room is taken over by the second MCU, and thereby, the conference room continues.

SUMMARY

According to a first aspect, this specification discloses a communication method for performing communication among a plurality of conference servers, a management server, and a plurality of clients. The communication method includes: transmitting a change request from a first conference server to the management server, the first conference server being connected with each of a plurality of particular clients for controlling a particular conference room in which the plurality of particular clients participate, the change request being a request for changing the first conference server to another conference server; in response to receiving the change request, determining, by the management server, that a second conference server is a conference server that controls the particular conference room after the first conference server; transmitting an ID identifying the second conference server from the management server to the first conference server; in response to receiving the ID, transmitting a control request from the first conference server to the second conference server based on the ID, the control request being for controlling the particular conference room; performing communication between the second conference server and the management server to confirm, by the management server, whether the second conference server is permitted to control the particular conference room; when the second conference server is permitted to control the particular conference room, performing an initialization processing by the second conference server to control the particular conference room; transmitting a completion notification of the initialization processing from the second conference server to the first conference server; transmitting a change instruction from the first conference server to each of the plurality of particular clients, the change instruction being an instruction for connecting with the second conference server to perform the particular conference room through the second conference server; connecting each of the plurality of particular clients with the second conference server; and after connecting all of the plurality of particular clients with the second conference server, disconnecting connection between each of the plurality of particular clients and the first conference server.

According to a second aspect, this specification also discloses a non-transitory computer-readable storage medium storing a communication program. The communication program is executable on a computer of a first conference server that performs communication among a management server, a plurality of clients, and a second conference server. The communication program causes, when executed, the first conference server to perform operations including: transmitting a change request to the management server, the first conference server being connected with each of a plurality of particular clients for controlling a particular conference room in which the plurality of particular clients participate, the change request being for changing the first conference server to another conference server; after transmitting the change request, receiving an ID identifying the second conference server from the management server, the second conference server being determined by the management server as a conference server that controls the particular conference room after the first conference server; transmitting a control request to the second conference server based on the received ID, the control request being a request for controlling the particular conference room; receiving a completion notification of an initialization processing from the second conference server, after the second conference server is permitted by the management server to control the particular conference room, and the second conference server performs the initialization processing for controlling the particular conference room; in response to receiving the completion notification, transmitting a change instruction to each of the plurality of particular clients, the change instruction being an instruction for connecting with the second conference server to perform the particular conference room through the second conference server; and after connecting all of the plurality of particular clients with the second conference server, disconnecting connection between each of the plurality of particular clients and the first conference server.

According to a third aspect, this specification also discloses a non-transitory computer-readable storage medium storing a communication program for communication performed among a management server, a plurality of clients, a first conference server, and a second conference server. The communication program is executable on a computer of the second conference server that performs the communication. The communication program causes, when executed, the second conference server to perform operations including: receiving a change request from the first conference server, the first conference server being connected with each of a plurality of particular clients for controlling a particular conference room in which the plurality of particular clients participate, the change request being a request for changing the first conference server to the second conference server; in response to receiving the change request, performing communication with the management server to confirm, by the management server, whether the second conference server is permitted to control the particular conference room; when the second conference server is permitted by the management server to control the particular conference room, performing an initialization processing to control the particular conference room, and transmitting a completion notification of the initialization processing to the first conference server; after transmitting the completion notification, connecting with each of the plurality of particular clients; and after connecting with all of the plurality of particular clients, transmitting a disconnection permission notification to the first conference server, the disconnection permission notification being a notification for disconnecting connection between each of the plurality of particular clients and the first conference server.

BRIEF DESCRIPTION OF THE DRAWINGS

Embodiments in accordance with this disclosure will be described in detail with reference to the following figures wherein:

FIG. 2 is a diagram showing various types of tables;

DETAILED DESCRIPTION

Figure 1:
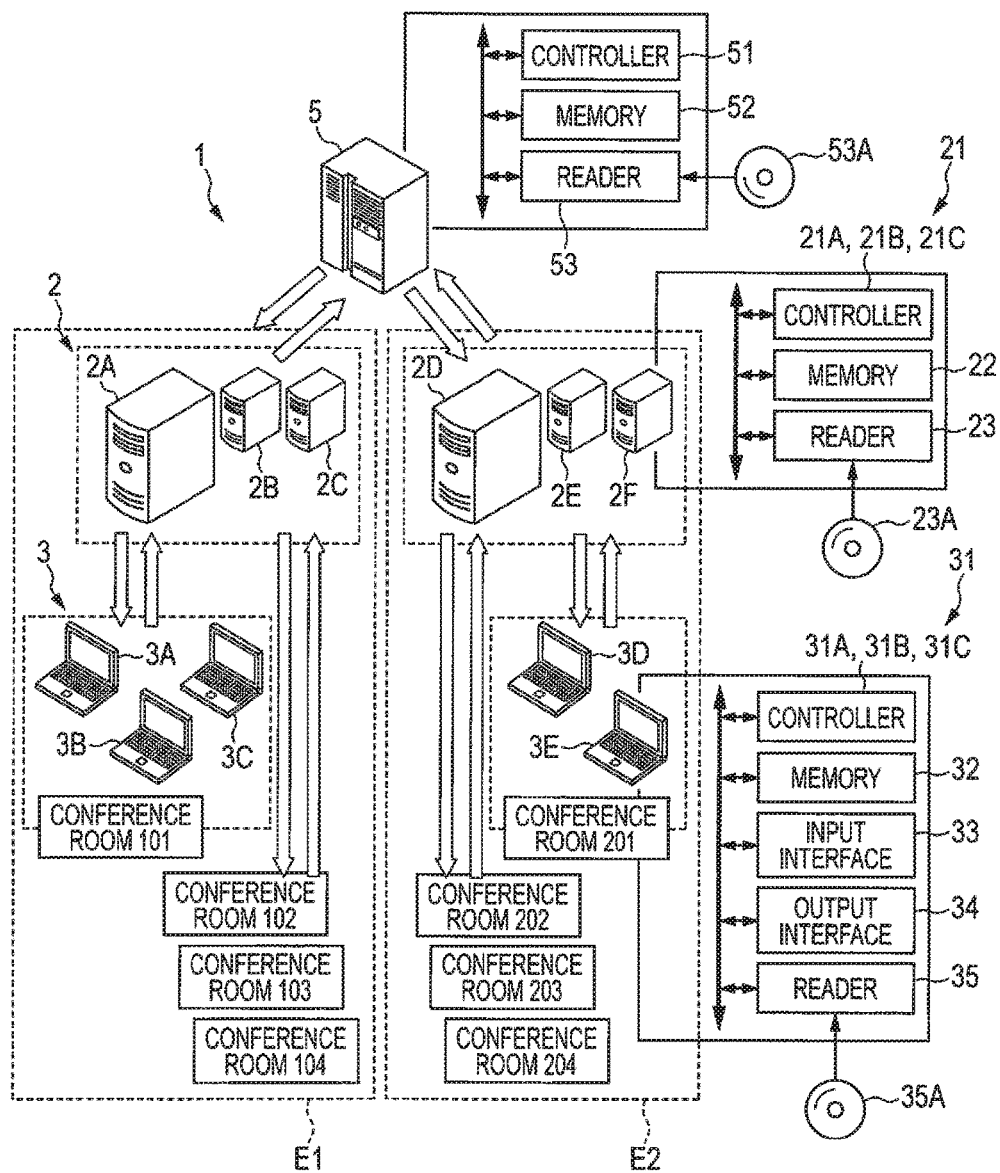
FIG. 1 is a diagram showing an overview of a communication system 1.

In the known method, until the MCU switching is completed in all conference terminals, the conference room controlled by the first MCU and the conference room controlled by the second MCU may coexist. In addition, each of the conference terminals participates only in one of the conference rooms. In this case, communication between the conference terminals participating in the respective conference rooms is not performed. Thus, the conference room may be temporarily interrupted.

An aspect of this disclosure is to provide a communication method and a storage medium storing a communication program capable of switching an MCU without interrupting a conference room, for example.

<Overview of Communication System 1>

A communication system 1 will be described with reference to FIG. 1. The communication system 1 includes conference servers 2A, 2B, 2C, 2D, 2E, 2F, and so on (collectively referred to as a "conference server 2"), clients 3A, 3B, 3C, 3D, 3E, and so on (collectively referred to as a "client 3"), and a management server 5. The conference servers 2A to 2C and the clients 3A to 3C are installed in a base E1. The conference servers 2D to 2F and the clients 3D, 3E are installed in a base E2 that is different from the base E1. The conference server 2, the client 3, and the management server 5 are connected to each other through a network not shown (such as a LAN and the Internet).

The client 3 performs communication with the conference server 2 installed in the same base to participate in a virtual conference room (hereinafter, simply referred to as a "conference room") and perform a teleconference. The client 3 is a known personal computer (PC) to which a program of a teleconference application is installed, for example.

The client 3 has a controller 31, a memory 32, an input interface 33, an output interface 34, and a reader 35. The controller 31 takes charge of the overall control by the client 3. The memory 32 stores various types of programs executed by the controller 31, and a table 32A (see FIG. 2) described later. The input interface 33 includes a camera, a microphone, a keyboard, a mouse, and so on. The output interface 34 includes an LCD, a speaker, and so on. The reader 35 reads information stored in a storage medium 35A such as a semiconductor memory and an optical disc. The controller 31 causes the reader 35 to read a program stored in the storage medium 35A and causes the memory 32 to store the program. The program stored in the memory 32, for example, may be downloaded from another server connected to the network not shown. Hereinafter, the controllers 31 of the clients 3A, 3B, and 3C are referred to as controllers 31A, 31B, and 31C.

As shown in FIG. 2, for example, a table 32A is stored in the memory 32 of the client 3A. In the table 32A, a conference room ID, a conference setting, and a user ID are associated with each other. The conference room ID indicates a conference room in which the client 3A participates. The conference setting indicates setting information (for example, enabling/disabling of document sharing, coediting, desktop sharing, a remote setting function and so on, a recording function, and so on) of the conference room indicated by the corresponding conference room ID. The user ID indicates a user who uses the client 3A.

When the client 3A participates in a conference room 101 (see FIG. 1), the controller 31A of the client 3A stores a conference room ID "101" in the table 32A. The controller 31A performs communication with the conference server 2 to acquire a conference setting "XXX" and stores the conference setting in the table 32A. The controller 31A stores a user ID "U101A" inputted through the input interface 33 in the table 32A.

As shown in FIG. 1, the conference server 2 holds and controls a conference room in order to perform a teleconference among the clients 3. The conference server 2 relays video data and audio data among the clients 3 that participate in the conference room. The conference server 2 is configured by installation of a program of a dedicated application to a multi-point control unit (MCU) or a known server, for example.

The conference server 2 has a controller 21, a memory 22, and a reader 23. The controller 21 takes charge of the overall control by the conference server 2. The memory 22 stores various types of programs executed by the controller 21, and a table 22A (see FIG. 2) described later. The reader 23 reads information stored in a storage medium 23A such as a semiconductor memory and an optical disc. The controller 21 causes the reader 23 to read a program stored in the storage medium 23A and causes the memory 22 to store the program. The program stored in the memory 22, for example, may be downloaded from another server connected to the network not shown. Hereinafter, the controllers 21 of the conference servers 2A, 2B, and 2C are referred to as controllers 21A, 21B, and 21C.

As shown in FIG. 2, for example, a table 22A is stored in the memory 22 of the conference server 2A. In the table 22A, a conference room ID, a conference setting, a user ID, and a client ID are associated with each other. The conference room ID indicates a conference room controlled by the conference server 2A. The client ID indicates the client 3 participating in the conference room indicated by the corresponding conference room ID. The user ID indicates a user who uses the client 3 indicated by the corresponding client ID.

When starting the control of a conference room 101, the controller 21A of the conference server 2A sets a conference room ID "101" of the conference room 101 and a conference setting "XXX" and stores the conference room ID and the conference setting in the table 22A. The controller 21A performs communication with each of the clients 3A, 3B, and 3C participating in the conference room 101 to acquire user IDs "U101A", "U101B", and "U101C" and client IDs "3A", "3B", and "3C" and store the user IDs and the client IDs in the table 22A. Information stored in the table 22A is periodically transmitted to the management server 5.

As shown in FIG. 1, the management server 5 manages a conference room controlled by the conference server 2. In the present embodiment, the management server 5 selects another conference server 2 in order to cause the other conference server 2 to control the conference room controlled by a specific conference server 2. In this case, the conference server 2 relaying video data and audio data related to the conference room is changed to the other conference server 2. Thus, the conference server 2 in which the clients 3 participating in the conference room perform communication of the video data and audio data is also changed to the other conference server 2.

The management server 5 has a controller 51, a memory 52, and a reader 53. The controller 51 takes charge of the overall control by the management server 5. The memory 52 stores various types of programs executed by the controller 51, and a table 52A (see FIG. 2) described later. The reader 53 reads information stored in a storage medium 53A such as a semiconductor memory and an optical disc. The controller 51 causes the reader 53 to read a program stored in the storage medium 53A and causes the memory 52 to store the program. The program stored in the memory 52, for example, may be downloaded from another server connected to the network not shown.

As shown in FIG. 2, a table 52A is stored in the memory 52 of the management server 5. In the table 52A, a base ID, a conference server ID, a conference room ID, a conference setting, a user ID, and a client ID are associated with each other. The base ID indicates a base where the conference server 2 controlling the conference room indicated by the corresponding conference room ID and the client 3 participating in the conference room are installed. The conference server ID indicates the conference server 2 controlling the conference room indicated by the corresponding conference room ID. The client ID indicates the client 3 participating in the conference room indicated by the corresponding conference room ID.

The controller 51 of the management server 5 receives the conference room ID, the conference setting, the user ID, and the client ID periodically transmitted from the conference server 2. The controller 51 associates the received information with the conference server ID of the conference server 2, and the base ID indicating the base of the conference server 2 and stores the associated information in the table 52A. For example, when receiving a conference room ID "101", a conference setting "XXX", user IDs "U101A", "U101B", and "U101C", and client IDs "3A", "3B", and "3C" transmitted from the conference server 2A, the controller 51 associates the information with a conference server ID "2A" of the conference server 2A and a base "E1" (see FIG. 2) and stores the associated information in the table 52A.

<First Communication Sequence>

A first communication sequence will be described with reference to FIG. 3. The first communication sequence specifically indicates a communication procedure in a case where the conference server 2A controlling the conference room 101 (see FIG. 1) is changed to the conference server 2B. It is assumed that, in the first communication sequence, the controller 21A of the conference server 2A controls the conference room 101 and the clients 3A to 3C participate in the conference room 101. Therefore, a session for the conference room 101 is connected between the conference server 2A and the clients 3A to 3C (S100). FIG. 2 corresponds to the tables 22A, 32A, and 52A in a state where the session for the conference room 101 is connected between the conference server 2A and the clients 3A to 3C.

Figure 3:
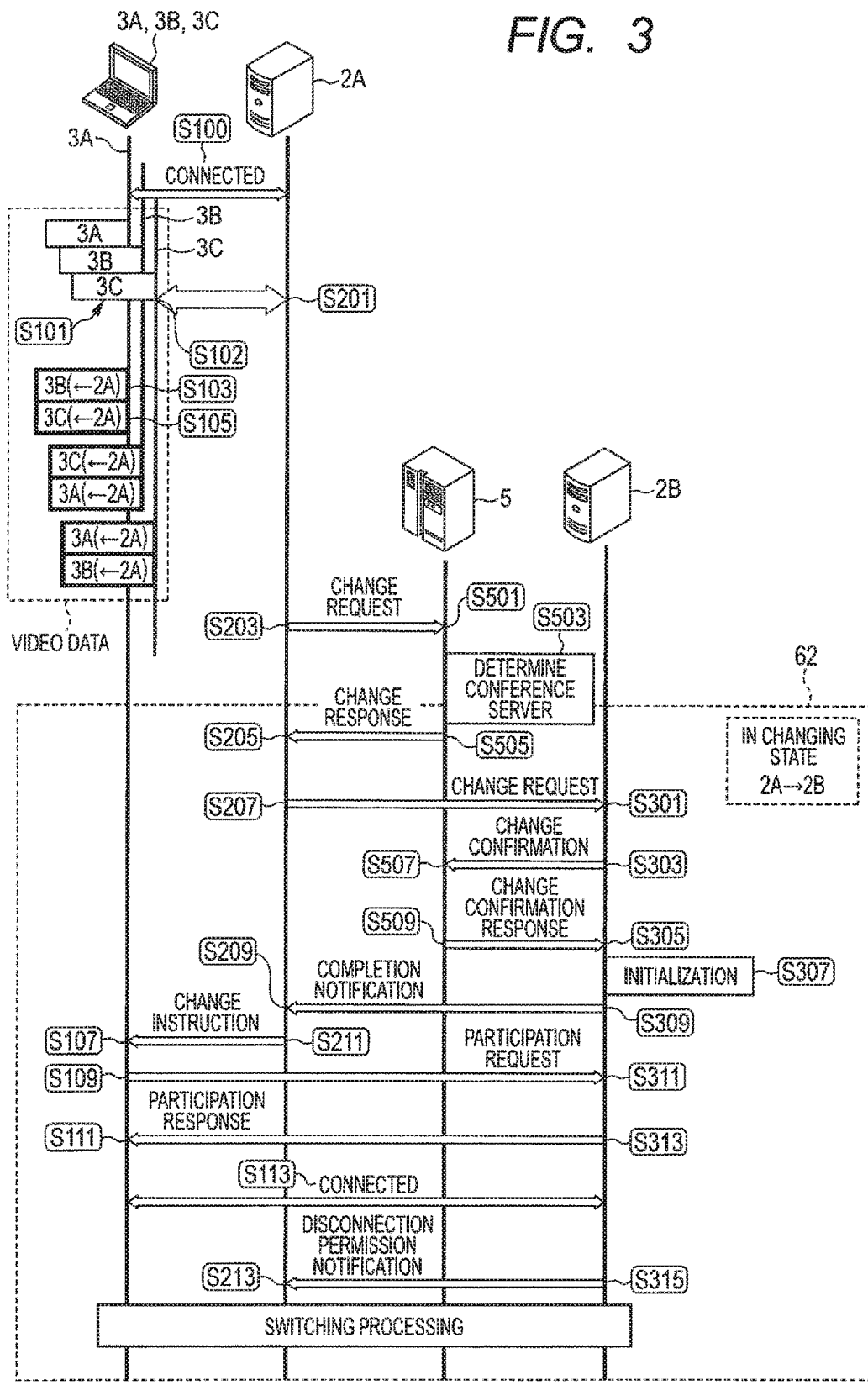
FIG. 3 is a diagram showing a first communication sequence.

As shown in FIG. 3, the controllers 31A to 31C of the clients 3A to 3C encode video data shot by a camera of the input interfaces 33 (see FIG. 1) to generate an I-frame and a P-frame (collectively referred to as a "frame") (S101). The I-frame (intra-coded frame) indicates a frame that is a basis and holds all pieces of information. The P-frame (predicted frame) holds only information that is different from information of the preceding I-frame. Decoding can be performed based on the P-frame and the preceding I-frame. The I-frame is generated in a first cycle and the P-frame is generated in a second cycle that is shorter than the first cycle. The controllers 31A to 31C transmit the generated frames to the conference server 2A with which the session is connected (S102).

The controller 21A of the conference server 2A receives the frames transmitted from the client 3A and forwards the frames to the clients 3B and 3C (S201). The controller 21A receives the frames transmitted from the client 3B and forwards the frames to the clients 3A and 3C (S201). The controller 21A of the conference server 2A receives the frames transmitted from the client 3C and forwards the frames to the clients 3A and 3B (S201). That is, when receiving the frames transmitted from the client 3, the controller 21A forwards the frames to the other clients 3 except the client 3 that is a transmission source. Each of the controllers 31A to 31C of the clients 3A to 3C receives the frames forwarded by the conference server 2A (S102).

The controller 31A of the client 3A decodes the P-frame using the I-frame as a basis, for the received frames of the clients 3B and 3C and generates original video data (S103, S105). The controller 31A controls an LCD of the output interfaces 34 (see FIG. 1) to display a video image based on the video data of the client 3A shot by the camera and the respective image data of the client 3B and 3C generated by the decoding. Although detailed description is omitted, similar processing is performed also by the controllers 31B and 31C of the clients 3B and 3C and the LCD displays a video image.

The controller 21A of the conference server 2A receives instruction for changing the conference server 2A controlling the conference room 101 (see FIG. 1) to another conference server 2. As a specific example of when such instruction is received, there is a case where a manager of the communication system 1 temporarily forbids the use of the conference server 2A in order to perform maintenance of the conference server 2A. As another specific example, there is a case where the controller 21A detects that a processing load of the controller 21A of the conference server 2A is a predetermined threshold or more.

When receiving the instruction described above, the controller 21A of the conference server 2A transmits change request data for requesting change of the conference server 2A controlling the conference room 101 to another conference server 2, to the management server 5 (S203). The change request data includes the conference room ID "101" stored in the table 22A.

The controller 51 of the management server 5 receives the change request data (S501). The controller 51 acquires the conference room ID "101" included in the change request data to specify the conference room 101. The controller 51 determines one of the conference servers 2 other than the conference server 2A that has transmitted the change request data, as the conference server 2 that controls the conference room 101, based on the table 52A (see FIG. 2).

For example, the controller 51 extracts a base ID associated with the conference server ID of the conference server 2A that has transmitted the change request data, among the conference server IDs stored in the table 52A. The controller 51 determines the conference server ID "2B" that is other than "2A" and has the smallest number of the associated conference room IDs, from among the conference server IDs associated with the extracted base ID (S503). Thereby, the controller 51 determines the conference server 2B that is assumed to have the smallest processing load of the controller 21, from among the conference servers 2 installed in the same base E1 (see FIG. 1) where the conference server 2A is installed. The controller 51 temporarily stores the conference room ID "101" and the conference server ID "2B" in the memory 52 for using the information for the processing according to change confirmation data received in S507 described later.

The determination method of the conference server ID is not limited to the method described above. For example, the controller 51 may determine the conference server ID that is other than "2A" and has the smallest number of the associated client IDs, from among the conference servers ID associated with the extracted base ID, in the table 52A.

The controller 51 transmits change response data for notifying the determined conference sever ID "2B", that is, the conference server ID of the conference server 2B after change, to the conference server 2A that has transmitted the change request data (S505). The change response data includes the determined conference server ID "2B".

The controller 21A of the conference server 2A receives the change response data (S205). The controller 21A acquires the conference server ID "2B" included in the received change response data to specify the conference server 2B. The controller 21A transmits change request data for requesting the change of the control of the conference room 101, to the specified conference server 2B (S207). The change request data includes the conference room ID "101" of the conference room 101 of which the change of the control is requested. The change request data further includes, as conference information, the conference setting "XXX", the user IDs "U101A", "U101B", and "U101C", and the client IDs "3A", "3B", and "3C" associated with the conference room ID "101" in the table 22A (see FIG. 2).

The controller 21B of the conference server 2B receives the change request data transmitted from the conference server 2A (S301). The controller 21B acquires the conference room ID "101", and the client IDs "3A", "3B", and "3C" included in the received change request data to specify the conference room 101 and the conference information. The controller 21B transmits the change confirmation data for confirming whether the control of the specified conference room 101 is permitted, to the management server 5 (S303). The change confirmation data includes the conference server ID "2B" of the conference server 2B that has transmitted the change confirmation data and the conference room ID "101".

The controller 51 of the management server 5 receives the change confirmation data (S507). The controller 51 acquires the conference server ID "2B" and the conference room ID "101" included in the received change confirmation data. The controller 51 determines whether the acquired conference server ID "2B" and the conference room ID "101" match the conference server ID and the conference room ID temporarily stored in the memory 52 when the conference server 2B is determined in the processing at S503. In response to determining that these information match, the controller 51 transmits change confirmation response data for notifying that the control of the conference room 101 is permitted, to the conference server 2B (S509).

Although not shown, when determining that the conference server ID "2B" and the conference room ID "101" acquired from the change confirmation data are different from the conference server ID and the conference room ID temporarily stored in the memory 52, the controller 51 transmits the change confirmation response data for notifying that the control of the conference room 101 is forbidden, to the conference server 2B.

The controller 21B of the conference server 2B receives the change confirmation response data transmitted from the management server 5 (S305). When the received change confirmation response data indicates that the control of the conference room 101 is permitted, the controller 21B performs an initialization processing for controlling the conference room 101 (S307). In the initialization processing, various types of settings for performing the control of the conference room 101 is performed based on the conference information specified from the change request data received in the processing at S301. After the initialization processing is completed, the controller 21B transmits completion notification data for notifying that the initialization processing is completed, to the conference server 2A that has transmitted the change request data (S309).

The controller 21A of the conference server 2A receives the completion notification data (S209). The controller 21A refers to the table 22A to specify the clients 3A, 3B, and 3C participating in the conference room 101 based on the client IDs "3A", "3B", and "3C" associated with the conference room ID "101". The controller 21A transmits change instruction data that instructs the connection of the session with the conference server 2B for performing the conference room 101 through the conference server 2B, to the specified clients 3A to 3C (S211). The change instruction data includes the conference server ID "2B" acquired from the change response data received in the processing at S205.

The controllers 31A to 31C of the clients 3A to 3C receive the change instruction data (S107). The controllers 31A to 31C acquire the conference server ID "2B" included in the change instruction data to specify the conference server 2B. The controller 31 connects the session for the conference room 101 with the specified conference server 2B and transmits participation request data for requesting participation in the conference room 101, to the conference server 2B (S109). For example, the participation request data transmitted from the client 3A includes the client ID "3A" of the client 3A, and the conference room ID "101" and the user ID "U101A" stored in the table 32A (see FIG. 2).

The controller 21B of the conference server 2B receives the participation request data (S311). The controller 21B acquires the conference room ID, the client ID, and the user ID included in the received participation request data. When the acquired conference room ID, the client ID, and the user ID match the conference information set by the initialization processing at S307, the controller 21B connects the session to transmit participation response data for permitting participation in the conference room 101 to the clients 3A to 3C that have transmitted the participation request data (S313).

The controllers 31A to 31C of the clients 3A to 3C receive the participation response data (S111). The session for the conference room 101 is connected between the conference server 2B and the clients 3A to 3C (S113). The session for the conference room 101 is also connected between the conference server 2A and the clients 3A to 3C (S100). When all sessions between the controller 21B of the conference server 2B and the clients 3A to 3C are connected, the controller 21B of the conference server 2B transmits disconnection permission notification data for notifying that the session between the conference server 2A and the clients 3A to 3C can be disconnected, to the conference server 2A (S315). The controller 21A of the conference server 2A receives the disconnection permission notification data (S213). The controller 21A of the conference server 2A, the controller 21B of the conference serve 2B, and the controllers 31A to 31C of the clients 3A to 3C perform communication based on a second communication sequence (see FIG. 4 and FIG. 5) to perform a switching processing.

<Second Communication Sequence>

The second communication sequence will be described with reference to FIG. 4. Each of the clients 3A to 3C is in a state where the session of the conference room 101 has been connected with both of the conference servers 2A and 2B (S600, S700, S800). The controllers 31A to 31C of the clients 3A to 3C encode the video data shot by the camera of the input interface 33 (see FIG. 1) to generate the P-frames (S601, S701, S801). It is assumed that only the P-frames are generated in the second cycle until the I-frame are generated in response to elapse of the first cycle (S615, S713, S811) as described later. The controllers 31A to 31C transmit the generated P-frames to both of the conference servers 2A, 2B (S602, S603).

Each of the controllers 21A, 21B of the conference servers 2A, 2B receives P-frames transmitted from the client 3A and forwards the P-frames to the clients 3B, 3C (S230, S330). Each of the controllers 21A, 21B receives P-frames transmitted from the client 3B and forwards the P-frames to the clients 3A, 3C (S230, S330). Each of the controllers 21A, 21B receives P-frames transmitted from the client 3C and forwards the P-frames to the clients 3A, 3B (S230, S330). Each of the controllers 31A to 31C of the clients 3A to 3C receives the P-frames forwarded by the conference servers 2A, 2B (S602, S603).

The controller 31A of the client 3A decodes the P-frames of the clients 3B, 3C received by the processing at S602, that is, the P-frames forwarded by the conference server 2A by using, as a basis, the I-frame (S102, see FIG. 3) received from the conference server 2A before the session with the conference server 2B is connected, and generates original video data (S605, S607). The controller 31A controls the LCD of the output interface 34 (see FIG. 1) to display a video image based on the video data of the client 3A shot by the camera and the video data of the clients 3B and 3C generated by decoding. Although detailed description is omitted, the controllers 31B, 31C of the clients 3B, 3C similarly perform processing of decoding the P-frame forwarded by the conference server 2A (S705, S707, S805, S807), and the respective LCDs display the video images.

It is assumed that the controller 31C of the client 3C has generated an I-frame by encoding of the video data shot by the camera, in response to elapse of the first cycle. The controller 31C transmits the generated I-frame to the conference server 2B with which a session is newly connected (S811). The controller 21B of the conference server 2B receives the I-frame transmitted from the client 3C (S331) and forwards the I-frame to the clients 3A, 3B (S333, S335). Each of the controllers 31A, 31B of the clients 3A, 3B receives the I-frame forwarded by the conference server 2B (S611, S711).

It is assumed that the controller 31B of the client 3B has generated an I-frame by encoding of the video data shot by the camera, in response to elapse of the first cycle. The controller 31B transmits the generated I-frame to the conference server 2B with which a session is newly connected (S713). The controller 21B of the conference server 2B receives the I-frame transmitted from the client 3B (S337) and forwards the I-frame to the clients 3A, 3C (S339, S341). Each of the controllers 31A, 31C of the clients 3A, 3C receives the I-frame forwarded by the conference server 2B (S613, S813).

It is assumed that the controller 31A of the client 3A has generated an I-frame by encoding of the video data shot by the camera, in response to elapse of the first cycle. The controller 31A transmits the generated I-frame to the conference server 2B with which a session is newly connected (S615). The controller 21B of the conference server 2B receives the I-frame transmitted from the client 3A (S343) and forwards the I-frame to the clients 3B, 3C (S345, S347). Each of the controllers 31B, 31C of the clients 3B, 3C receives the I-frame forwarded by the conference server 2B (S715, S815).

Figure 5:
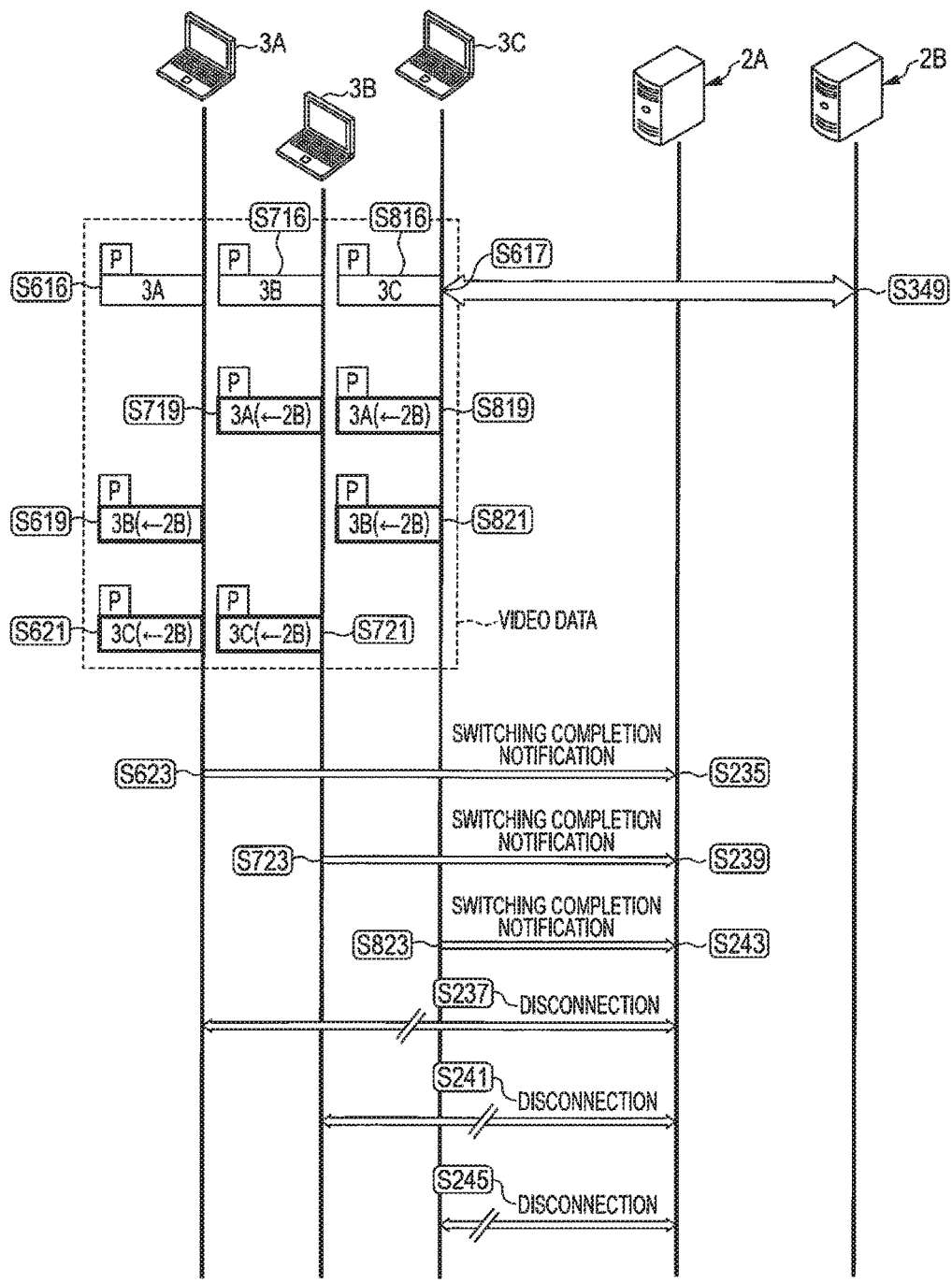
FIG. 5 is a diagram showing the second communication sequence continued from FIG. 4.

Next, as shown in FIG. 5, it is assumed that the controllers 31A to 31C of the clients 3A to 3C have generated the P-frame by encoding of the video data shot by the camera in response to elapse of the second cycle (S616, S716, S816). Each of the controllers 31A to 31C transmits the generated P-frame to the conference server 2B with which the session is newly connected (S617).

The controller 21B of the conference server 2B receives the P-frame transmitted from the client 3A and forwards the P-frame to the clients 3B, 3C (S349). The controller 21B receives the P-frame transmitted from the client 3B and forwards the P-frame to the clients 3A, 3C (S349). The controller 21B receives the P-frame transmitted from the client 3C and forwards the P-frame to the clients 3A, 3B (S349). Each of the controllers 31A to 31C of the clients 3A to 3C receives the P-frame forwarded by the conference server 2B (S617).

The controller 31A of the client 3A decodes the P-frames of the client 3B received by the processing at S617, that is, the P-frames forwarded by the conference server 2B by using, as a basis, the I-frame received by the processing at S613 (see FIG. 4) and generates original video data (S619). The controller 31A decodes the P-frames of the client 3C received by the processing at S617, that is, the P-frames forwarded by the conference server 2B by using, as a basis, the I-frame received by the processing at S611 (see FIG. 4) and generates original video data (S621). The controller 31A controls the LCD of the output interface 34 (see FIG. 1) to display a video image based on the video data of the client 3A shot by the camera and the video data of the clients 3B, 3C generated by the processing at S619, S621.

Figure 4:
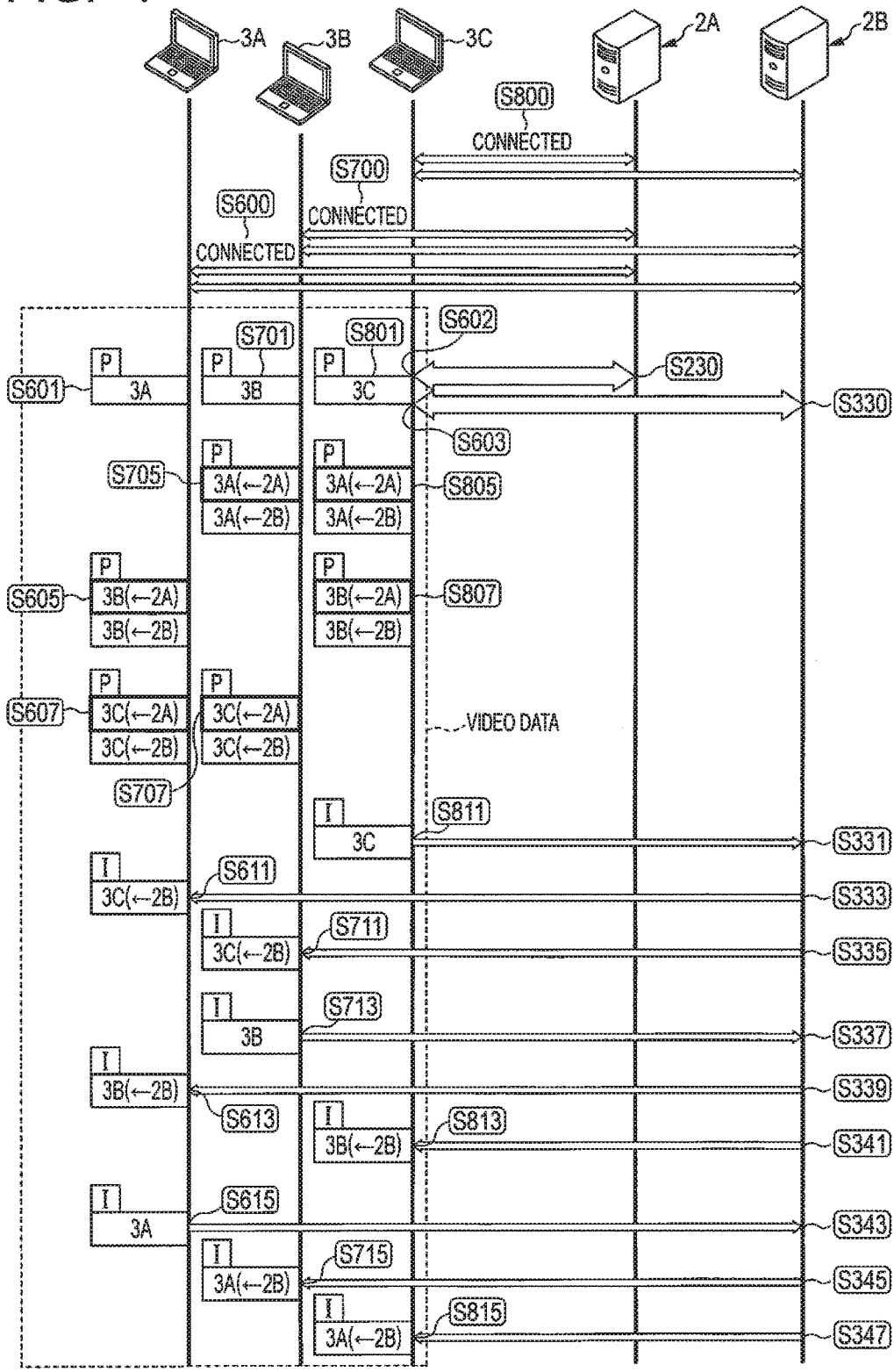
FIG. 4 is a diagram showing a second communication sequence.

By the processing described above, the controller 31A of the client 3A receives the I-frame transmitted from each of the clients 3B, 3C, through the conference server 2B (S611, S613, see FIG. 4). After receiving the I-frames, the controller 31A receives the P-frames transmitted from each of the clients 3B, 3C through the conference server 2B and starts decoding processing (S619, S621, see FIG. 5). That is, the controller 31A receives the I-frames from all other clients 3B, 3C participating in the conference room 101 and then starts the decoding processing in response to receiving of the P-frames. In this case, the controller 31A transmits switching completion notification data for notifying that switching preparation of the conference server 2B is completed, to the conference server 2A (S623). The controller 21A of the conference server 2A receives the switching completion notification data (S235).

The communication procedure that is similar to that described above is performed also between the conference server 2A and the clients 3B, 3C. Details are as follows. The controller 31B of the client 3B receives the I-frame transmitted from each of the clients 3A, 3C through the conference server 2B (S711, S715, see FIG. 4). When receiving the P-frame after receiving the I-frame (S617), the controller 31B starts decoding processing by using the I-frame as a basis (S719, S721). The controller 31B transmits the switching completion notification data to the conference server 2A (S723). The controller 21A of the conference server 2A receives the switching completion notification data (S239). The controller 31C of the client 3C receives the I-frame transmitted from each of the clients 3A, 3B through the conference server 2B (S813, S815). When receiving the P-frame after receiving the I-frame, the controller 31C starts decoding processing by using the I-frame as a basis (S819, S821). The controller 31C transmits the switching completion notification data to the conference server 2A (S823). The controller 21A of the conference server 2A receives the switching completion notification data (S243).

The controller 21A receives disconnection permission notification data transmitted from the conference server 2B by the processing at S213 (see FIG. 3). When receiving the disconnection permission notification data (S213) and receiving the switching completion notification data from all the clients 3A to 3C (S235, S239, S243), the controller 21A disconnects the session with each of the clients 3A to 3C (S237, S241, S245). Thus, each of the clients 3A to 3C is in a state where the session is connected only with the conference server 2B.

<Third Communication Sequence>

A third communication sequence will be described with reference to FIG. 6. The third communication sequence specifically indicates a communication procedure for connecting the session between the clients 3B, 3C and the conference server 2 in a case where there are the clients 3B, 3C requesting participation in the conference room 101 during the change of the conference server 2 by the first communication sequence (see FIG. 3) and the second communication sequence (see FIG. 4 and FIG. 5). Here, it is assumed that, in the third communication sequence, the controller 21A of the conference server 2A controls the conference room 101 and only the client 3A is participating in the conference room 101. Therefore, the session for the conference room 101 is connected between the conference server 2A and the client 3A (S261).

Figure 6:
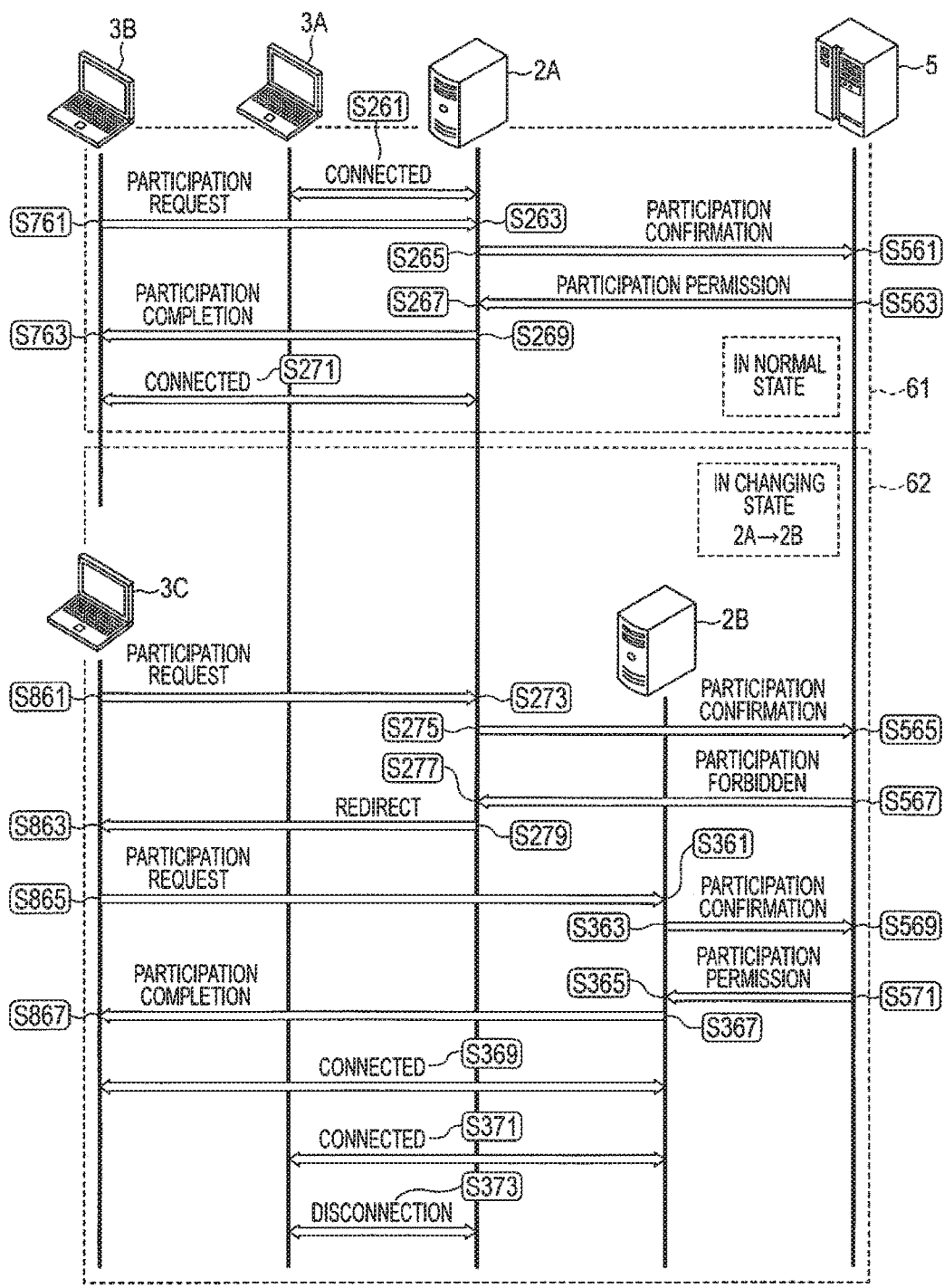
FIG. 6 is a diagram showing a third communication sequence.

An area within a dotted line frame in FIG. 6 indicates a normal state 61 and a changing state 62. The changing state 62 indicates a state of the process in which the conference server 2 controlling the conference room 101 is changed from the conference server 2A to the conference server 2B in the first communication sequence (see FIG. 3) and the second communication sequence (see FIG. 4 and FIG. 5). More specifically, the changing state 62 indicates a state of the communication system 1 from when the controller 51 of the management server 5 transmits, to the conference server 2A, the change response data for notifying the conference server ID "2B " of the conference server 2B after change (S505, see FIG. 3) in the first communication sequence (see FIG. 3) until when the sessions between the conference server 2A and the clients 3A to 3C are disconnected (S237, S241, S245) in the second communication sequence (see S241, S245). The normal state 61 indicates a state other than the changing state 62.

As shown in FIG. 6, in the normal state 61, the controller 31B of the client 3B transmits the participation request data that requests participation in the conference room 101 to the conference server 2A controlling the conference room 101 (S761). The participation request data includes the conference room ID "101" of the conference room 101. The controller 21A of the conference server 2A receives the participation request data (S263). The controller 21A acquires the conference room ID "101" included in the participation request data to specify the conference room 101. The controller 21A transmits, to the management server 5, participation confirmation data for inquiring whether the client 3B that has transmitted the participation request data is permitted to participate in the conference room 101 (S265). The participation confirmation data includes the conference room ID "101".

The controller 51 of the management server 5 receives the participation confirmation data (S561). The controller 51 acquires the conference room ID "101" included in the participation confirmation data to specify the conference room 101. The controller 51 determines whether it is in the changing state 62 for changing the conference server 2 controlling the specified conference room 101 from the conference server 2A that has transmitted the participation confirmation data to another conference server 2. When it is determined to be in the normal state 61, the controller 51 transmits participation permission data that notifies that participation in the conference room 101 is permitted, to the conference server 2A that has transmitted the conference confirmation data (S563).

The controller 21A of the conference server 2A receives the participation permission data (S267). The controller 21A transmits participation completion data for notifying that the participation in the conference room 101 is completed, to the client 3B that has transmitted the participation request data (S269). The controller 31B of the client 3B receives the participation completion data (S763). Thereby, the session for the conference room 101 is connected between the conference server 2A and the client 3B (S271).

In the changing state 62, the controller 31C of the client 3C transmits participation request data that requests participation in the conference room 101 to the conference server 2A controlling the conference room 101 (S861). The participation request data includes the conference room ID "101" of the conference room 101. The controller 21A of the conference server 2A receives the participation request data (S273). The controller 21A acquires the conference room ID "101" included in the participation request data to specify the conference room 101. The controller 21A transmits, to the management server 5, the participation confirmation data for inquiring whether the client 3C that has transmitted the participation request data is permitted to participate in the conference room 101 (S275). The participation confirmation data includes the conference room ID "101".

The controller 51 of the management server 5 receives the participation confirmation data (S565). The controller 51 acquires the conference room ID "101" included in the participation confirmation data to specify the conference room 101. The controller 51 determines whether it is in the changing state 62 for changing the conference server 2 controlling the specified conference room 101 from the conference server 2A that has transmitted the participation confirmation data to another conference server 2. When it is determined that it is in the changing state 62 for changing from the conference server 2A to the conference server 2B, the controller 51 transmits participation forbidden data that notifies that the participation in the conference room 101 is forbidden, to the conference server 2A that has transmitted the participation confirmation data (S567). The participation forbidden data includes the conference server ID "2B" of the conference server 2B after change.

The controller 21A of the conference server 2A receives the participation forbidden data (S277). The controller 21A acquires the conference server ID "2B" from the received participation forbidden data to specify the conference server 2B. The controller 21A transmits redirect data for notifying the specified conference server 2B, to the client 3C that has transmitted the participation request data (S279). The redirect data includes the conference server ID "2B".

The controller 31C of the client 3C receives the redirect data (S863). The controller 31C acquires the conference server ID "2B" included in the redirect data to specify the conference server 2B. The controller 31C transmits the participation request data that requests participation in the conference room 101, to the specified conference server 2B (S865). The participation request data includes the conference room ID "101" of the conference room 101.

The controller 21B of the conference server 2B receives the participation request data (S361). The controller 21B acquires the conference room ID "101" included in the participation request data to specify the conference room 101. The controller 21B transmits, to the management server 5, participation confirmation data for inquiring whether the client 3C that has transmitted the participation request data is permitted to participate in the conference room 101 (S363). The participation confirmation data includes the conference room ID "101".

The controller 51 of the management server 5 receives the participation confirmation data (S569). The controller 51 acquires the conference room ID "101" included in the participation confirmation data to specify the conference room 101. The controller 51 determines whether it is in the changing state for changing the conference server 2 controlling the specified conference room 101 from the conference server 2B that has transmitted the participation confirmation data to another conference server 2. Here, the changing state 62 is a state of the process for changing the conference server 2A to another conference server and is not changing the conference server 2B to another conference server 2. Thus, the controller 51 transmits the participation permission data that notifies that the participation in the conference room 101 is permitted, to the conference server 2B that has transmitted the participation confirmation data (S571).

The controller 21B of the conference server 2B receives the participation permission data (S365). The controller 21B transmits participation completion data for notifying that the participation in the conference room 101 is completed, to the client 3C that has transmitted the participation request data (S367). The controller 31C of the client 3C receives the participation completion data (S867). Thereby, the session for the conference room 101 between the conference server 2B and the client 3C is connected (S369).

The changing state 62 ends when the session between the conference server 2B and the client 3A is connected (S371), and then, the session between the conference server 2A and the client 3A is disconnected (S373).

As described above, in the communication system 1, the connection between the clients 3A to 3C and the conference server 2A is disconnected (S237, S241, S243) after all the clients 3A to 3C participating in the conference room 101 by connecting the session between the clients and the conference server 2A are connected with the conference server 2B (S113, S619, S621, S719, S721, S819, S821). In this case, a situation is prevented in which the client 3 connecting only with the conference server 2A (that is, the client 3 connecting with the conference server 2A before switching) and the client 3 connecting only with the conference server 2B (that is, the client 3 connecting with the conference server 2B after switching) participate in the common conference room 101. Thus, it is prevented that video image and sound are interrupted in the conference room 101 and the conference room 101 is temporarily interrupted. Accordingly, the communication system 1 can perform the conference room 101 continuously without the user knowing the change of the conference server 2. In addition, the user of the client 3 can change the conference server 2 while continuing the conference room 101 that is being performed, without manually changing the conference server 2 that is the connection destination.

In the first communication sequence, after connecting the session with the conference server 2B (S113), each of the clients 3A to 3C transmits the I-frame to the other clients 3 through the conference server 2B (S615, S713, S811). When receiving the I-frames from all the other clients 3 through the conference server 2B (S611, S613, S711, S715, S813, S815), each of the clients 3A to 3C transmits switching completion notification data to the conference server 2A (S623, S723, S823). After that, when the conference server 2A receives the switching completion notification data from all the clients 3A to 3C, the sessions between the conference server 2A and the clients 3A to 3C are disconnected (S237, S241, S245). In this case, each of the clients 3A to 3C confirms that all the clients 3A to 3C connect with the conference server 2B by receiving the I-frame, and disconnects the session with the conference server 2A. Thus, it is further reliably prevented that the conference room 101 is temporarily interrupted.

In the first communication sequence, when the sessions between all the clients 3A to 3B and the conference server 2B are connected (S113), the conference server 2B transmits the disconnection permission notification data to the conference server 2A (S315). After that, when the conference server 2A receives the disconnection permission notification data (S213), the sessions between the conference server 2A and the clients 3A to 3C are disconnected (S237, S241, S245). In this case, after the sessions between the conference server 2B and the clients 3A to 3C are connected, the connections between the conference server 2A and the clients 3A to 3C are disconnected. Thus, it is further reliably prevented that the conference room 101 is temporarily interrupted.

In the first communication sequence, when receiving the I-frames from the other clients 3 through the conference server 2B (S611, S613, S711, S715, S813, S815) and receiving the P-frame (S617), each of the clients 3A to 3C decodes the P-frame by using the I-frame as a basis (S619, S621, S719, S721, S819, S821). In this case, the size of the P-frame can be suppressed, and therefore, an increase in the communication traffic can be prevented. By decoding the P-frame by using the I-frame as a basis, it is possible for the clients 3A to 3C to prevent interruption of video image and sound and generation of a blank time, for example.

In the first communication sequence, when each of the clients 3A to 3C starts processing of decoding the P-frame by using the I-frame as a basis after connecting the session with the conference server 2B (S619, S621, S719, S721, S819, S821), each of the clients 3A to 3C transmits the switching completion notification data to the conference server 2A (S623, S723, S823). When the sessions with the clients 3A to 3C are connected (S113), the conference server 2B transmits disconnection permission notification data to the conference server 2A (S315). When the conference server 2A receives the switching completion notification data and the disconnection permission notification data (S213, S235, S239, S243), the sessions between the conference server 2A and the clients 3A to 3C are disconnected (S237, S241, S245). In this case, the sessions between the clients 3A to 3C and the conference server 2A are disconnected after the decoding processing by the clients 3A to 3C is started. Thus, after the conference room 101 through the conference server 2B is started, the clients 3A to 3C can smoothly start the decoding processing and smoothly perform the conference room 101.

In the third communication sequence, when the conference server 2A receives the participation request data from the client 3C (S273), the conference server 2A transmits the participation confirmation data to the management server 5 (S275). When it is determined to be in the changing state 62 for changing from the conference server 2A to another conference server 2, the management server 5 transmits, to the conference server 2A, the participation forbidden data including the conference server ID "2B" of the conference server 2B after change (S567). The conference server 2A transmits the redirect data for notifying the specified conference server 2B to the client 3C (S279). In response to receiving the redirect data (S863), the client 3C transmits the participation request data to the conference server 2B (S865). Thus, the session for the conference room 101 is connected between the conference server 2B and the client 3C (S369). In this way, in the process of changing the conference server 2 controlling the conference room 101 from the conference server 2A to the conference server 2B, when the client 3C wishes to participate in the conference room 101, the conference server 2A causes the client 3C to connect with the conference server 2B after change. Thus, the client 3C can participate in the conference room 101 by connecting with the conference server 2B continuously even after the conference server 2 is switched.

While the disclosure has been described in detail with reference to the above aspects thereof, it would be apparent to those skilled in the art that various changes and modifications may be made therein without departing from the scope of the claims.

For example, in the first communication sequence, when the conference server 2A receives the switching completion notification data (S235, S239, S243), the sessions between the conference server 2A and the clients 3A to 3C are disconnected (S237, S241, S245). Alternatively, when the conference server 2A receives the disconnection permission notification data (S213), the sessions between the conference server 2A and the clients 3A to 3C may be disconnected irrespective of whether the conference server 2A has received the switching completion notification data.

In the first communication sequence, when the sessions between all the clients 3A to 3B and the conference server 2B are connected (S113), the conference server 2B transmits the disconnection permission notification data to the conference server 2A (S315). After that, the sessions between the conference server 2A and the clients 3A to 3C are disconnected (S237, S241, S245). Alternatively, when the conference server 2A receives the switching completion notification data (S235, S239, S243), the sessions between the conference server 2A and the clients 3A to 3C may be disconnected regardless of whether the conference server 2A has received the disconnection permission notification data.

In the above description, communication of video data in the clients 3A to 3C is performed by using the I-frame and the P-frame. Thereby, the video data is compressed. Alternatively, the video data may not be compressed and directly communicated among the clients 3A to 3C.

In the first communication sequence, after the sessions between the clients 3A to 3C and the conference server 2B are connected, when processing of decoding the P-frame using the I-frame as a basis (S619, S621, S719, S721, S819, S821) is started, each of the clients 3A to 3C transmits the switching completion notification data to the conference server 2A (S623, S723, S823). Alternatively, in response to receiving the I-frame (S611, S613, S711, S715, S813, S815), the clients 3A to 3C may transmit the switching completion notification data to the conference server 2A regardless of whether the P-frame is received.

In the third communication sequence, by performing communication with the management server 5 (S265, S267, S275, S277), the conference server 2A determines whether to connect the session between the conference server 2A and the client 3C that has transmitted the participation request data (S269) or to connect the session between the conference server 2B and the client 3C (S279). Alternatively, the conference server 2A may perform the above-described determination without performing communication with the management server 5. Specifically, when the conference server 2A has not received the change response data from the management server 5, the conference server 2A may determine that the session is to be connected between the conference server 2A and the client 3C that has transmitted the participation request data. On the other hand, when the conference server 2A has received the change response data from the management server 5 by the processing at S205, the conference server 2A may determine that the session is to be connected between the client 3C and the conference server 2B of the conference server ID "2B" included in the change response data.

What is claimed is:

1. A communication method for performing communication among a plurality of conference servers, a management server, and a plurality of clients, the communication method comprising:

transmitting a change request from a first conference server to the management server, the first conference server being connected with each of a plurality of particular clients for controlling a particular conference room in which the plurality of particular clients participate, the change request being a request for changing the first conference server to another conference server;

in response to receiving the change request, determining, by the management server, that a second conference server is a conference server that controls the particular conference room after the first conference server;

transmitting an ID identifying the second conference server from the management server to the first conference server;

in response to receiving the ID, transmitting a control request from the first conference server to the second conference server based on the ID, the control request being for controlling the particular conference room;

performing communication between the second conference server and the management server to confirm, by the management server, whether the second conference server is permitted to control the particular conference room;

when the second conference server is permitted to control the particular conference room, performing an initialization processing by the second conference server to control the particular conference room;

transmitting a completion notification of the initialization processing from the second conference server to the first conference server;

transmitting a change instruction from the first conference server to each of the plurality of particular clients, the change instruction being an instruction for connecting with the second conference server to perform the particular conference room through the second conference server;

connecting each of the plurality of particular clients with the second conference server;

after connecting all of the plurality of particular clients with the second conference server, disconnecting connection between each of the plurality of particular clients and the first conference server;

receiving, by the first conference server, a participation request from another client other than the plurality of particular clients in a period from when the ID is transmitted to the first conference server until connection between each of the plurality of particular clients and the first conference server is disconnected, the participation request being a request for participating in the particular conference room; and in response to receiving the participation request, connecting the other client with the second conference server.

2. The communication method according to claim 1, further comprising:

after connecting each of the plurality of particular clients with the second conference server, transmitting, by one particular client, a key frame to other particular clients through the second conference server, and receiving a key frame from all the other particular clients through the second conference server;

in response to transmitting the key frame to the other particular clients and receiving the key frame from all the other particular clients, transmitting a switching completion notification from the one particular client to the first conference server; and in response to receiving the switching completion notification by the first conference server, disconnecting connection between the one particular client and the first conference server.

3. The communication method according to claim 1, further comprising:

when all of the plurality of particular clients are connected with the second conference server, transmitting a disconnection permission notification from the second conference server to the first conference server; and in response to receiving the disconnection permission notification by the first conference server, disconnecting connection between each of the plurality of particular clients and the first conference server.

4. The communication method according to claim 2, further comprising:

after each of the plurality of particular clients receives the key frame from the other particular clients through the second conference server, receiving a non-key frame transmitted from the other particular clients through the second conference server, and starting a decoding processing, the non-key frame being a frame other than the key frame.

5. The communication method according to claim 4, further comprising:

after starting the decoding processing, transmitting the switching completion notification from each of the plurality of particular clients to the first conference server;

when all of the plurality of particular clients are connected with the second conference server, transmitting a disconnection permission notification from the second conference server to the first conference server; and in response to receiving the switching completion notification and the disconnection permission notification by the first conference server, disconnecting connection between the plurality of particular clients and the first conference server.

6. The communication method according to claim 1, further comprising:

determining, by the management server, whether a current state is a changing state or a normal state, the changing state being a state in the period from when the ID is transmitted to the first conference server until connection between each of the plurality of particular clients and the first conference server is disconnected, the normal state being a state other than the changing state;

in response to determining that the current state is the normal state, transmitting participation permission data from the management server to the first conference server for connecting the other client with the first conference server; and in response to determining that the current state is the changing state, transmitting the ID from the management server to the other client through the first conference server for connecting the other client with the second conference server.

7. The communication method according to claim 1, further comprising:

in response to receiving the participation request from the other client, transmitting participation confirmation data from the first conference server to the management server;

in response to receiving the participation confirmation data, transmitting participation forbidden data from the management server to the first conference server, the participation forbidden data including the ID of the second conference server;

in response to receiving the participation forbidden data, transmitting redirect data from the first conference server to the other client, the redirect data including the ID of the second conference server;

in response to receiving the redirect data, transmitting another participation request from the other client to the second conference server;

in response to receiving the other participation request from the other client, transmitting another participation confirmation data from the second conference server to the management server;

in response to receiving the other participation confirmation data, transmitting participation permission data from the management server to the second conference server; and in response to receiving the participation permission data, transmitting participation completion data from the second conference server to the other client.

8. A non-transitory computer-readable storage medium storing a communication program, the communication program being executable on a computer of a first conference server that performs communication among a management server, a plurality of clients, and a second conference server, the communication program causing, when executed, the first conference server to perform operations comprising:

transmitting a change request to the management server, the first conference server being connected with each of a plurality of particular clients for controlling a particular conference room in which the plurality of particular clients participate, the change request for changing the first conference server to another conference server;

after transmitting the change request, receiving an ID identifying the second conference server from the management server, the second conference server being determined by the management server as a conference server that controls the particular conference room after the first conference server;

transmitting a control request to the second conference server based on the received ID, the control request being a request for controlling the particular conference room;

receiving a completion notification of an initialization processing from the second conference server, after the second conference server is permitted by the management server to control the particular conference room, and the second conference server performs the initialization processing for controlling the particular conference room;

in response to receiving the completion notification, transmitting a change instruction to each of the plurality of particular clients, the change instruction being an instruction for connecting with the second conference server to perform the particular conference room through the second conference server;

after connecting all of the plurality of particular clients with the second conference server, disconnecting connection between each of the plurality of particular clients and the first conference server;

in response to receiving a participation request from another client other than the plurality of particular clients without receiving the ID from the management server, determining that a session for the particular conference room is to be connected between the first conference server and the other client, the participation request being a request for participating in the particular conference room; and in response to receiving the participation request from the other client after receiving the ID from the management server, determining that the session is to be connected between the second conference server and the other client.

* * * * *